US008631162B2

(12) United States Patent
Elzur et al.

(10) Patent No.: US 8,631,162 B2
(45) Date of Patent: Jan. 14, 2014

(54) SYSTEM AND METHOD FOR NETWORK INTERFACING IN A MULTIPLE NETWORK ENVIRONMENT

(75) Inventors: Uri Elzur, Irvine, CA (US); Frankie Fan, Diamond Bar, CA (US); Steven B. Lindsay, Mission Viejo, CA (US); Scott S. McDaniel, Villa Park, CA (US)

(73) Assignee: Broadcom Corporation, Irvine, CA (US)

( * ) Notice: Subject to any disclaimer, the term of this patent is extended or adjusted under 35 U.S.C. 154(b) by 2173 days.

(21) Appl. No.: 10/652,327

(22) Filed: Aug. 29, 2003

(65) Prior Publication Data

US 2004/0044798 A1 Mar. 4, 2004

Related U.S. Application Data

(60) Provisional application No. 60/477,279, filed on Jun. 10, 2003, provisional application No. 60/478,106, filed on Jun. 11, 2003, provisional application No. 60/408,617, filed on Sep. 6, 2002, provisional application No. 60/407,165, filed on Aug. 30, 2002, provisional application No. 60/456,265, filed on Mar. 30, 2003, provisional application No. 60/456,260, filed on Mar. 20, 2003, provisional application No. 60/410,022, filed on Sep. 11, 2002, provisional application No. 60/411,294, filed on Sep. 17, 2002, provisional application No. 60/408,207, filed on Sep. 4, 2002, provisional application No. 60/405,539, filed on Aug. 23, 2002, provisional application No. 60/398,663, filed on Jul. 26, 2002, provisional application No. 60/434,503, filed on Dec. 18, 2002, provisional application No. 60/403,817, filed on Aug. 14, 2002, provisional application No. 60/404,709, filed on Aug. 19, 2002, provisional application No. 60/419,354, filed on Oct. 18, 2002, provisional application No. 60/420,901, filed on Oct. 24, 2002, provisional application No. 60/439,951, filed on Jan. 14, 2003, provisional application No. 60/442,360, filed on Jan. 24, 2003, provisional application No. 60/425,959, filed on Nov. 12, 2002, provisional application No. 60/456,266, filed on Mar. 20, 2003, provisional application No. 60/437,887, filed on Jan. 2, 2003, provisional application No. 60/456,322, filed on Mar. 20, 2003, provisional application No. 60/551,361, filed on Mar. 10, 2004.

(51) Int. Cl.
*G06F 15/16* (2006.01)

(52) U.S. Cl.
USPC .......................................... 709/250; 709/253

(58) Field of Classification Search
USPC .................... 709/229, 230, 250, 253
See application file for complete search history.

(56) References Cited

U.S. PATENT DOCUMENTS 5,941,969 A   8/1999   Ram et al.
6,041,356 A   3/2000   Mohammed et al.
(Continued)

OTHER PUBLICATIONS

Microsoft, Winsock Direct and Protocol Offload on SANs, Mar. 3, 2001, download.microsoft.com/download/1/6/1/161ba512-40e2-4cc9-843a-923143f3456c/WinsockDirect-ProtocolOffload.doc.*

(Continued)

*Primary Examiner* — Hieu Hoang

(74) *Attorney, Agent, or Firm* — Thomas | Horstemeyer, LLP

(57) ABSTRACT

Systems and methods that network interface in a multiple network environment are provided. In one embodiment, the system includes, for example, a network connector, a processor, a peripheral component interface (PCI) bridge and a unified driver. The processor may be coupled to the network connector and to the PCI bridge. The processor may be adapted, for example, to process a plurality of different types of network traffic. The unified driver may be coupled to the PCI bridge and may be adapted to provide drivers associated with the plurality of different types of network traffic.

30 Claims, 3 Drawing Sheets

(56) References Cited

U.S. PATENT DOCUMENTS

| | | | |
|---|---|---|---|
| 6,049,528 A | 4/2000 | Hendel et al. | |
| 6,157,965 A | 12/2000 | Mohammed et al. | |
| 6,226,680 B1* | 5/2001 | Boucher et al. | 709/230 |
| 6,243,785 B1 | 6/2001 | Lowe et al. | |
| 6,253,334 B1 | 6/2001 | Amdahl et al. | |
| 6,421,728 B1 | 7/2002 | Mohammed et al. | |
| 6,675,200 B1* | 1/2004 | Cheriton et al. | 709/212 |
| 6,988,150 B2* | 1/2006 | Matters et al. | 710/36 |
| 7,142,540 B2* | 11/2006 | Hendel et al. | 370/392 |
| 7,194,519 B1* | 3/2007 | Muhlestein et al. | 709/215 |
| 2001/0023460 A1 | 9/2001 | Boucher et al. | |
| 2001/0049740 A1* | 12/2001 | Karpoff | 709/231 |
| 2002/0041566 A1* | 4/2002 | Yang et al. | 370/229 |
| 2002/0065924 A1* | 5/2002 | Barrall et al. | 709/227 |
| 2002/0198934 A1* | 12/2002 | Kistler et al. | 709/203 |
| 2003/0046330 A1* | 3/2003 | Hayes | 709/201 |
| 2004/0010674 A1* | 1/2004 | Boyd et al. | 711/170 |
| 2004/0213205 A1* | 10/2004 | Li et al. | 370/352 |

OTHER PUBLICATIONS

Callaghan NFS over RDMA. Fast 2002. Jan. 28, 2002.*

* cited by examiner

SYSTEM AND METHOD FOR NETWORK INTERFACING IN A MULTIPLE NETWORK ENVIRONMENT

CROSS-REFERENCE TO RELATED APPLICATIONS/INCORPORATION BY REFERENCE

This application makes reference to, claims priority to and claims benefit from U.S. Provisional Patent Application Ser. No. 60/477,279, entitled "System and Method for Network Interfacing in a Multiple Network Environment" and filed on Jun. 10, 2003; U.S. Provisional Patent Application Ser. No. 60/478,106, entitled "System and Method for Network Interfacing" and filed on Jun. 11, 2003; U.S. Provisional Patent Application Ser. No. 60/408,617, entitled "System and Method for TCP/IP Offload" and filed on Sep. 6, 2002; U.S. Provisional Patent Application Ser. No. 60/407,165, entitled "System and Method for TCP Offload" and filed on Aug. 30, 2002; U.S. Provisional Patent Application Ser. No. 60/456,265, entitled "System and Method for TCP Offload" and filed on Mar. 30, 2003; U.S. Provisional Patent Application Ser. No. 60/456,260, entitled "System and Method for Handling Out-of-Order Frames" and filed on Mar. 20, 2003; U.S. Provisional Patent Application Ser. No. 60/410,022, entitled "System and Method for TCP Offloading and Uploading" and filed on Sep. 11, 2002; U.S. patent application Ser. No. 10/298,817, entitled "System and Method for TCP Offloading and Uploading" and filed on Nov. 18, 2002; U.S. Provisional Patent Application Ser. No. 60/411,294, entitled "System and Method for Handling Partially Processed Frames" and filed on Sep. 17, 2002; U.S. patent application Ser. No. 10/302,474, entitled "System and Method for Handling Frames in Multiple Stack Environments" and filed on Nov. 21, 2002; U.S. Provisional Patent Application Ser. No. 60/408,207, entitled "System and Method for Fault Tolerant TCP Offload" and filed on Sep. 4, 2002; U.S. patent application Ser. No. 10/337,029, entitled "System and Method for Fault Tolerant TCP Offload" and filed on Jan. 6, 2003; U.S. Provisional Patent Application Ser. No. 60/405,539, entitled "Remote Direct Memory Access over TCP/IP using Generic Buffers for Non-Posting TCP" and filed on Aug. 23, 2002; U.S. Provisional Patent Application Ser. No. 60/398,663, entitled "Dual TCP/IP Stacks Connection Management for Winsock Direct (WSD)" and filed on Jul. 26, 2002; U.S. Provisional Patent Application Ser. No. 60/434,503, entitled "System and Method for Handling Multiple Stack Environments" and filed on Dec. 18, 2002; U.S. patent application Ser. No. 10/336,983, entitled "System and Method for Handling Multiple Stack Environments" and filed on Jan. 6, 2003; U.S. Provisional Patent Application Ser. No. 60/403,817, entitled "One Shot RDMA Having Only a 2 Bit State" and filed on Aug. 14, 2002; U.S. Provisional Patent Application Ser. No. 60/404,709, entitled "Optimizing RDMA for Storage Applications" and filed on Aug. 19, 2002; U.S. Patent Application Ser. No. 60/419,354, entitled "System and Method for Statistical Provisioning" and filed on Oct. 18, 2002; U.S. Patent Application Ser. No. 60/420,901, entitled "System and Method for Statistical Provisioning" and filed on Oct. 24, 2002; U.S. Patent Application Ser. No. 60/439,951, entitled "System and Method for Statistical Provisioning" and filed on Jan. 14, 2003; U.S. Patent Application Ser. No. 60/442,360, entitled "System and Method for Statistical Provisioning" and filed on Jan. 24, 2003; U.S. Provisional Patent Application Ser. No. 60/425,959, entitled "Joint Memory Management for User Space and Storage" and filed on Nov. 12, 2002; U.S. Provisional Patent Application Ser. No. 60/456,266, entitled "Self-Describing Transport Protocol Segments" and filed on Mar. 20, 2003; U.S. Provisional Patent Application Ser. No. 60/437,887, entitled "Header Alignment and Complete PDU" and filed on Jan. 2, 2003; U.S. Provisional Patent Application Ser. No. 60/456,322, entitled "System and Method for Handling Transport Protocol Segments" and filed on Mar. 20, 2003; and U.S. patent application Ser. No. 10/230,643, entitled "System and Method for Identifying Upper Layer Protocol Message Boundaries" and filed on Aug. 29, 2002. This application also makes reference to U.S. Provisional Application Ser. No. 60/551,361, filed on Mar. 10, 2004, which is hereby incorporated by herein by reference in its entirety.

The above-referenced U.S. patent applications are hereby incorporated herein by reference in their entirety.

FIELD OF THE INVENTION

Certain embodiments of the invention relate to network interfaces. More specifically, certain embodiments of the invention relate to a method and system for network interfacing in a multiple networking environment.

BACKGROUND OF THE INVENTION

FIG. 1 shows a server 100 adapted to handle five types of network traffic. The first type of network traffic is typical network traffic such as, for example, common Ethernet network traffic including Internet protocol (IP) or other layer 3 (L3) technologies transporting small amounts of data and control information around the network. The first type of network traffic is handled by a first network traffic system including an Ethernet connector 110; a layer 2 (L2) network interface card (NIC) arrangement 120 including an L2 NIC 130; a peripheral component interconnect (PCI) bridge 140; an L2 NIC driver 150; a full-feature software transmission control protocol (TCP) stack 160; a socket service switch 170; and a socket service 180. The full-feature software TCP stack 160 supports socket services as well as other services.

The second type of network traffic is TCP accelerated traffic such as, for example, TCP running on top of IP. The protocol is used to move large data across conventional Ethernet networks. The server 100 offloads the TCP portion of the network traffic, thereby freeing server resources for running non-networking tasks. The second type of network traffic is handled by a second network traffic system including a TCP offload engine (TOE) that accelerates TCP traffic. The second network traffic system includes an Ethernet connector 190; a layer 4 (L4) offload adapter arrangement 200 including an L2 NIC 210 and a TCP processor 220; the PCI bridge 140; an L4 driver 230; the socket service switch 170; and the socket service 180. The TCP accelerated traffic is typically serviced by the socket service 180.

The third type of network traffic is storage traffic. Conventional storage systems use small computer system interface (SCSI) or Fibre Channel technologies to connect the server 100 to storage disks. Both of these technologies share a common software interface or service, namely SCSI miniport. Recently, a protocol has been developed that provides SCSI traffic to be run over a TCP/IP network. The recent protocol removes the need for SCSI or Fibre Channel network connections, thereby allowing the storage traffic to be run over the same network as used for networking (e.g., Ethernet). The third type of network traffic is handled by a third network traffic system including an adapter that implements the recent protocol and provides SCSI miniport service. The third network traffic system includes an Ethernet connector 240; a storage host bus adapter (HBA) arrangement 250 including an L2 NIC 260, a TCP processor 270 and an Internet SCSI (iSCSI) processor 280; the PCI bridge 140; a SCSI driver 290; and a SCSI miniport service 300.

The fourth type of network traffic is interprocess communication (IPC) traffic. This type of network allows programs running on different servers to communicate quickly and with very low overhead. IPC networks are used with, for example, distributed applications, database servers and file servers. For example, IPC networks can be used when the computing power needed exceeds the capacity of a particular server or when multiple servers are used for ultra-reliable operation. This type of service is provided through a remote direct memory access (RDMA) interface (e.g., Winsock Direct) that directly interfaces with applications. The fourth type of network traffic is handled by a fourth network traffic system including an adapter that provides services as a dedicated, proprietary network (e.g., Infiniband products). The fourth network traffic system includes a proprietary network interface 310; an RDMA NIC arrangement 320 including an L2 NIC 330, an L4 processor and an RDMA processor 340; the PCI bridge 140; an RDMA driver 350; and an RDMA service 360 (e.g., Winsock Direct).

The fifth type of network traffic is any traffic relating to any type of operating system (OS) Agnostic Management Entity or device. These entities or devices monitor the state of the server 100 and transmit information relating to state and statistical values over the network. The fifth type of network traffic is handled by a fifth network traffic system that includes an Ethernet connector 370; a server management agent 380; and a keyboard/video/mouse service 390. The fifth network traffic system provides keyboard, video and mouse hardware services to the server 100 so that these interfaces can be redirected over the network to a central server management system.

The five network traffic systems supported by the server 100 use a substantial amount of space within the server and are typically quite costly. Combining the five types of networks is hindered on a number of fronts. For example, many operating systems insist that each connector have its own driver. Accordingly, each of the five network traffic systems has its own data and control paths. Furthermore, the use of proprietary network interfaces minimizes the possibility of integration. Thus, a number of hardware and software redundancies and inefficiencies remain.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be found in, for example, some embodiments of systems and methods that provide a network interface. In one embodiment, the present invention may provide a server. The server may include, for example, a network connector, a processor, a peripheral component interface (PCI) bridge and a unified driver. The processor may be coupled to the network connector and to the PCI bridge. The processor may be adapted, for example, to process a plurality of different types of network traffic. The unified driver may be coupled to the PCI bridge and may be adapted to provide drivers associated with the plurality of different types of network traffic.

In another embodiment, the present invention may provide a method for network interfacing. The method may include, for example, one or more of the following: handling a plurality of different types of network traffic via a layer 2 (L2) connector; processing the different types of network traffic in a single chip; and determining which of the different types of network traffic accesses software services via a single data path.

In yet another embodiment, the present invention may provide a method for network interfacing. The method may include, for example, one or more of the following: handling a plurality of different types of network traffic via a single Ethernet connector; processing the plurality of different types of network traffic using an L2 processor, a layer 3 (L3) processor, a layer 4 (L4) processor and an upper layer protocol (ULP) processor; and providing a unified data and control path.

These and other advantages, aspects and novel features of the present invention, as well as details of an illustrated embodiment thereof, will be more fully understood from the following description and drawings.

DETAILED DESCRIPTION OF THE INVENTION

Some aspects of the present invention may be found in, for example, systems and methods that provide network interfaces. Some embodiments according to the present invention may provide systems and methods that combine networking functions. For example, in one embodiment according to the present invention, a common networking adapter, a storage adapter, an interprocess communication (IPC) adapter and a management adapter may be combined into a single device. Substantial savings in cost and space may be achieved, for example, by time-division-multiplexing the resources of shared blocks or by dynamically allocating fixed resources between the different network types. Shared blocks may be developed that provide features (e.g., functions) applicable to one or more of the protocols. Shared blocks may also house special services that may not be used by all of the protocols.

Figure 1:
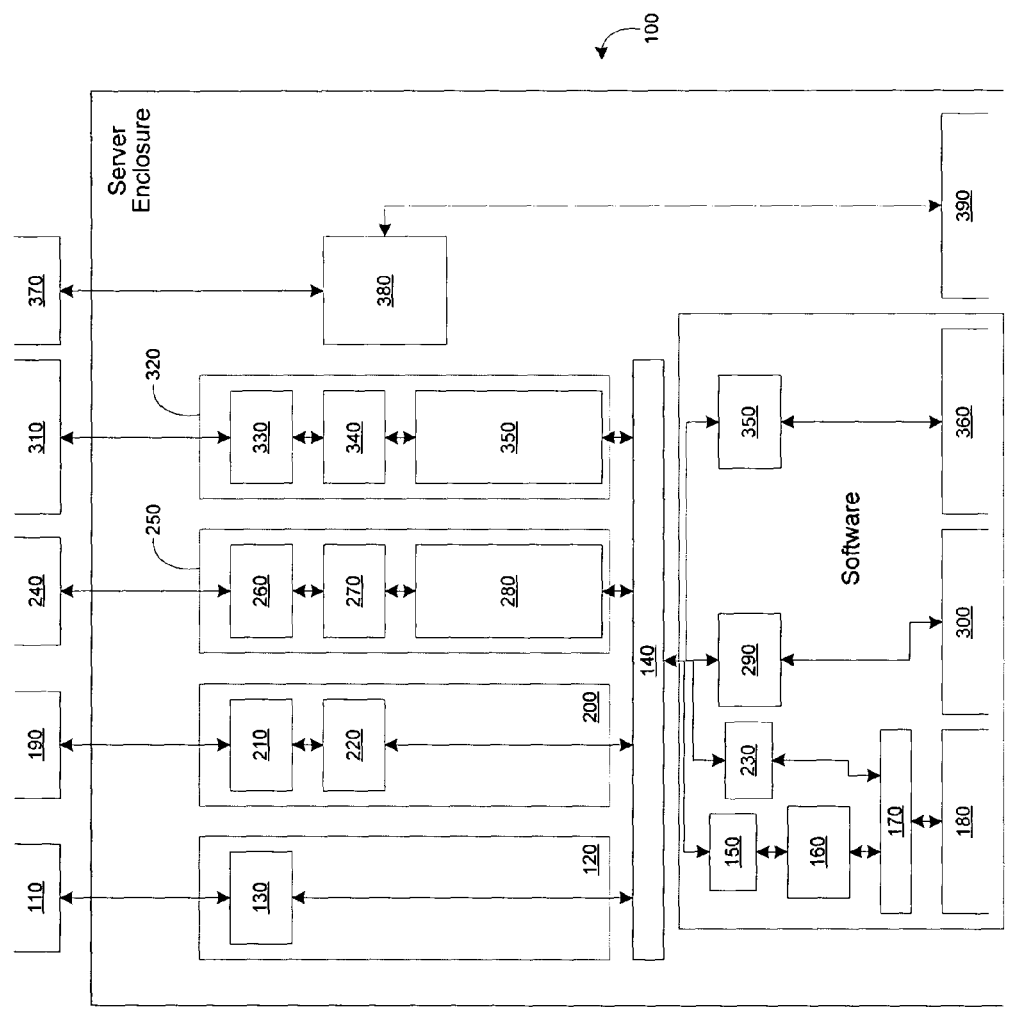
FIG. 1 shows a block representation illustrating an embodiment of a server.
Figure 2:
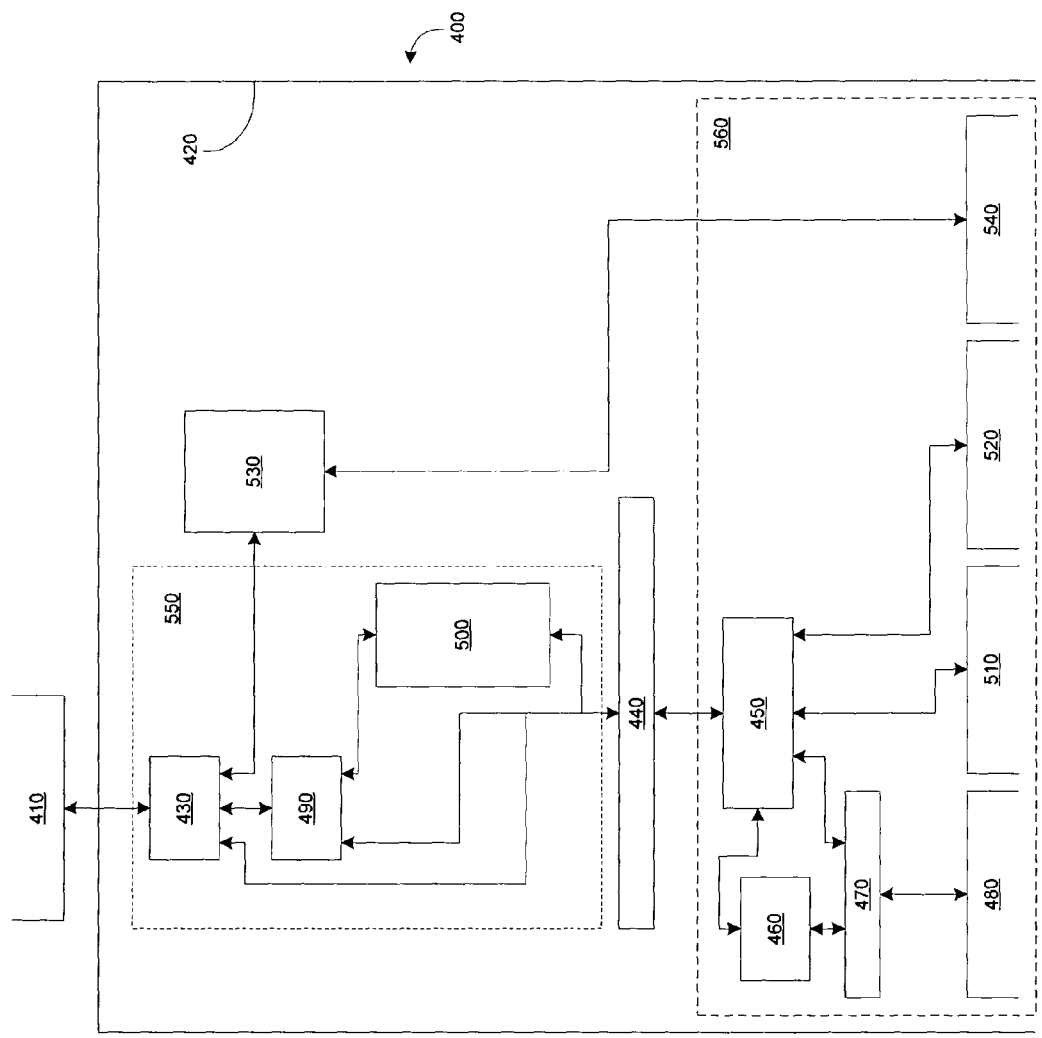
FIG. 2 shows a block representation illustrating an embodiment of a server according to the present invention.

FIG. 2 shows a block representation illustrating an embodiment of a server 400 according to the present invention. The server 400 may include, for example, an Ethernet connector 410 and a server enclosure 420. The present invention also contemplates using one or more Ethernet connectors 410. For example, additional Ethernet connectors 410 may be used to provide enhanced performance, fault tolerance or teaming. The server 400 may be adapted to handle a plurality of different networks via the one or more Ethernet connectors 410. As illustrated, in one embodiment according to the present invention, the server 400 may handle five different types of network traffic. However, the present invention also contemplates handling more or less than five different types of network traffic.

A first type of network traffic that the server 400 can handle may be, for example, common network traffic such as, for example, Ethernet network traffic employing, for example, Internet protocol (IP) technologies or other layer 3 (L3) technologies and transporting small amounts of data and control information around the network. The first type of network traffic may be handled by a first network traffic system that may include, for example, the Ethernet connector 410, a layer 2 (L2) network interface card (NIC) 430, a peripheral component interconnect (PCI) bridge 440, an unified driver 450, a software transmission control protocol (TCP) processor 460, a socket service switch 470 and a socket service 480. The Ethernet connector 410 may be coupled to the L2 NIC 430 which, in turn, may be coupled to the PCI bridge 440. The PCI bridge 440 may be coupled to the unified driver 450 which, in turn, may be coupled to the software TCP processor 460. The software TCP processor 460 may be coupled to the socket service switch 470 which, in turn, may be coupled to the socket service 480. The software TCP processor 460 may support, for example, socket services as well as other types of services.

A second type of network traffic that the server 400 can handle may be, for example, TCP accelerated traffic such as, for example, TCP running on top of IP. TCP over IP may be used to move large amounts of data across Ethernet networks. The server 400 may offload the TCP portion of the network traffic, thereby freeing server resources for running non-networking tasks. The second type of network traffic may be handled by a second network traffic system including, for example, a TCP offload engine (TOE) that can accelerate TCP traffic. The second network traffic system may include, for example, the Ethernet connector 410, the L2 NIC 430, a TCP processor 490, the PCI bridge 440, the unified driver 450, the socket service switch 470 and the socket service 480. The Ethernet connector 410 may be coupled to the L2 NIC 430 which, in turn, may be coupled to the TCP processor 490. The TCP processor 490 may be coupled to the PCI bridge which, in turn, may be coupled to the unified driver 450. The unified driver 450 may be coupled to the socket service switch 470 which, in turn, may be coupled to the socket service 480. The TCP accelerated traffic may be serviced by, for example, the socket service 480 or other types of services.

A third type of network traffic that the server 400 may handle may be, for example, storage traffic. The third type of network traffic may include, for example, a protocol (e.g., Internet SCSI (iSCSI)) that provides small computer system interface (SCSI) over a TCP/IP network. By using iSCSI, proprietary adapters may be avoided and storage traffic may run over a network shared by some or all of the different types of network traffic. The third type of network traffic may be handled by a third network traffic system that may include, for example, the Ethernet connector 410, the L2 NIC 430, the TCP processor 490, an iSCSI/remote-direct-memory access (RDMA) processor 500, the PCI bridge 440, the unified driver 450 and a SCSI miniport service 510. The Ethernet connector 410 may be coupled to the L2 NIC 430 which, in turn, may be coupled to the TCP processor 490. The TCP processor 490 may be coupled to the iSCSI/RDMA processor 500 which, in turn, may be coupled to the PCI bridge 440. The PCI bridge 440 may be coupled to the unified driver 450 which, in turn, may be coupled to the SCSI miniport service 510.

A fourth type of network traffic that the server 400 may handle may be, for example, IPC traffic. IPC networks may allow programs running on different servers to communicate quickly and without substantial overhead. IPC networks may be used with, for example, distributed applications, database servers and file servers. For example, IPC networks may be used when the requisite computing power exceeds the capacity of a particular server or when multiple servers are used for ultra-reliable operation. This type of service may be provided through an RDMA interface such as, for example, Winsock Direct that may directly interface with applications. The fourth type of network traffic may be handled by a fourth network traffic system that may include, for example, the Ethernet connector 410, the L2 NIC 430, the TCP processor 490, the iSCSI/RDMA processor 500, the PCI bridge 440, the unified driver 450 and an RDMA service 520 (e.g., Winsock Direct). The Ethernet connector 410 may be coupled to the L2 NIC 430 which, in turn, may be coupled to the TCP processor 490. The TCP processor 490 may be coupled to the iSCSI/RDMA processor 500 which, in turn, may be coupled to the PCI bridge 440. The PCI bridge 440 may be coupled to the unified driver 450 which, in turn, may be coupled to the RDMA service 520.

A fifth type of network traffic that the server 400 may handle may be, for example, any traffic relating to any type of operating system (OS) Agnostic Management Entity or device. These entities or devices may monitor the state of the server 400 and may transmit information relating to state and statistical values over the network. The fifth type of network traffic may be handled by a fifth network traffic system that may include, for example, the Ethernet connector 410, the L2 NIC 430, a server management agent 530 and a keyboard/video/mouse service 540. The fifth network traffic system may provide keyboard, video and mouse hardware services to the server 400 so that these interfaces may be redirected over the network to a central server management system (not shown). The Ethernet connector 410 may be coupled to the L2 NIC 430 which, in turn, may be coupled to the server management agent 530. The server management agent 530 may be coupled to the keyboard/video/mouse service 540.

The present invention contemplates employing different levels of integration. For example, according to one embodiment of the present invention, a single integrated chip 550 may include, for example, one or more of the following: the L2 NIC 430, the TCP processor 490 and the iSCSI/RDMA processor 500. In another embodiment according to the present invention, software 560 may provide, for example, one or more of the following: the TCP processor 460, the socket service switch 470, the socket service 480, the unified driver 450, the SCSI miniport service 510, the RDMA service 520 and the keyboard/video/mouse service 540.

Figure 3:
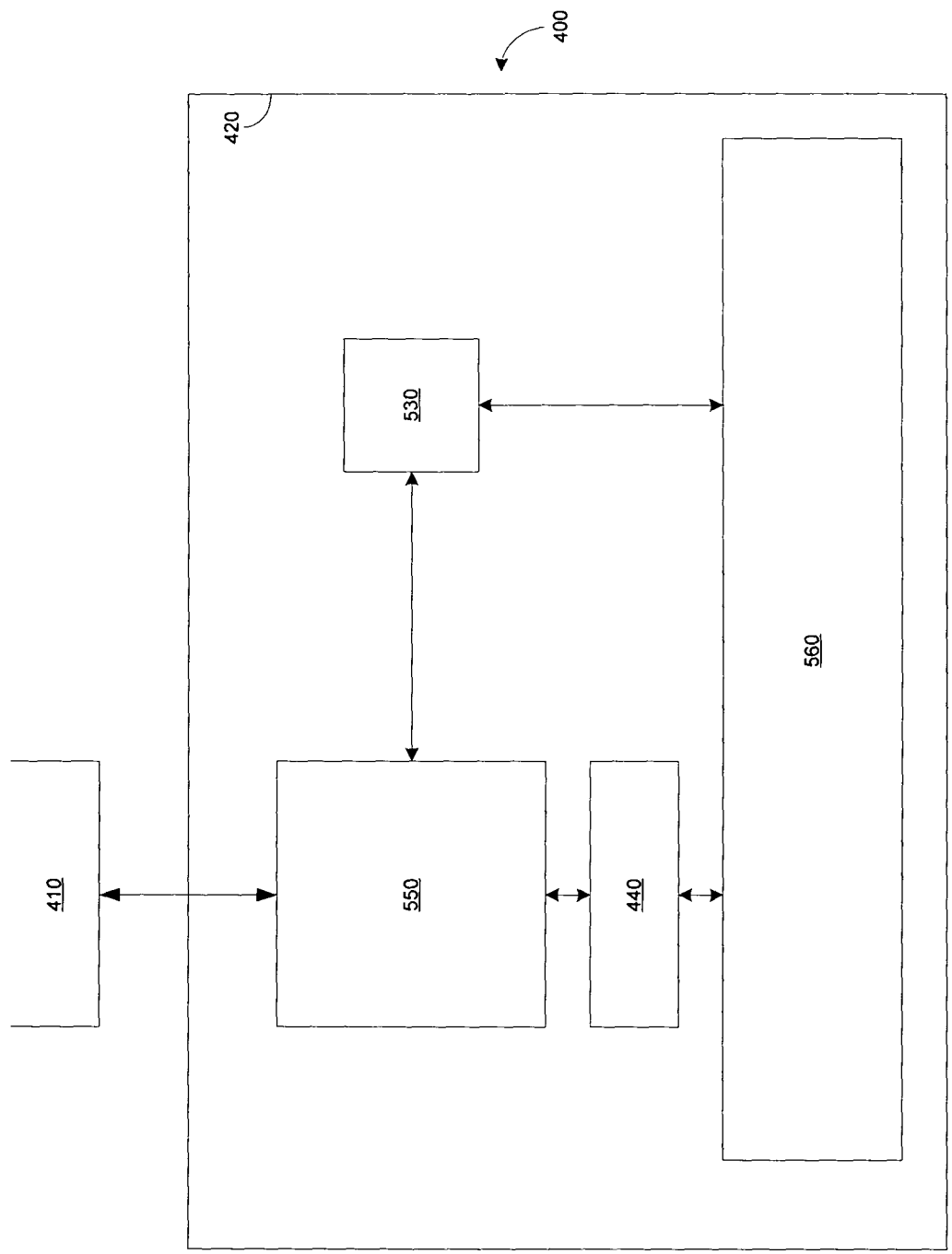
FIG. 3 shows a block representation illustrating an embodiment of a server according to the present invention.

FIG. 3 shows a block diagram illustrating the server 400 with some integrated components according to the present invention. In one embodiment according to the present invention, the server enclosure 420 houses the single integrated chip 550, the server management agent 530, the PCI bridge 440 and the software 560. The single integrated chip 550 may be coupled to the Ethernet connector 410, the PCI bridge 440 and the server management agent 530. The PCI bridge 440 and the server management agent 530 may each be coupled to the software 560. Thus, the single integrated chip 550 may handle, for example, five types of network traffic through a single Ethernet connector 410. The single integrated chip 550 or the PCI bridge 440 may determine which of the five types of network traffic may access the software 560 including the unified driver 450 and the various services 480, 510, 520 and 540. Access to the software 560 may be achieved via a number of different techniques including, for example, time division multiplexing and dynamically allocating fixed resources between the different network types.

Some embodiments according to the present invention may include one or more of the advantages as set forth below.

Some embodiments according to the present invention may employ a single Ethernet connector 410. Some embodiments may overcome a difficulty in that some operating systems insist that each connector for each type of traffic have a different driver. Furthermore, other embodiments may avoid the use of a layer 3 (L3) level switch which would be required to combine connections because input traffic would have to be sorted by IP address and sent only to the particular adapter with the particular IP address that might handle that particular traffic.

Some embodiments according to the present invention may provide a unified data path and control path. Such a unified approach may provide substantial cost and space savings through the integration of different components.

Some embodiments according to the present invention may share a TCP stack between the different types of network traffic systems. Cost savings may result from the elimination of redundant logic and code.

Some embodiments according to the present invention may share packet buffer memory. The network traffic systems may share the receive (RX) and the transmit (TX) buffer memory resources since the network traffic systems share a common Ethernet connection.

Some embodiments according to the present invention may share a direct memory access (DMA) engine and buffering technologies. Some of the network traffic systems and protocols may share buffering strategies and thus the logic for the mapping may be shared. Furthermore, since the DMA traffic may use a single Ethernet connection, buffering strategies may share the same DMA structure.

Some embodiments according to the present invention may have similar NIC-to-driver and driver-to-NIC strategies. By using a common technique for both directions of indication, cost may be saved over separate implementations.

Some embodiments according to the present invention may use a single IP address. By combining multiple networks and functions into a single NIC, a single IP address may be employed to serve them all. This may substantially reduce the number of IP addresses used in complex server systems and also may simplify the management and configurations of such systems.

Some embodiments according to the present invention may provide pooling and/or dynamic allocation of connection context data. The pooling of connection context between different protocols may allow substantial reductions in the storage space used and may make possible storing of connection context in a memory-on-a-chip implementation. The memory-on-a-chip implementation may remove, for example, the pins/power complexity associated with external memory.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A server, comprising:
a network connector;
a processor coupled to the network connector, the processor operable to process a plurality of different types of network traffic, wherein each of said plurality of different types of network traffic corresponds to a different network protocol;
a peripheral component interface (PCI) bridge coupled to the processor;
a unified driver coupled to the PCI bridge, the unified driver operable to provide drivers associated with the plurality of different types of network traffic; and
a plurality of services coupled to the unified driver.

2. The server according to claim 1, wherein the network connector comprises an Ethernet connector.

3. The server according to claim 1, wherein the plurality of different types of network traffic comprises two or more of common Ethernet traffic, offload traffic, storage traffic, inter-process communication (IPC) traffic, management traffic or remote direct memory access (RDMA) traffic.

4. The server according to claim 1, wherein the processor comprises a single integrated chip.

5. The server according to claim 1, wherein the processor comprises a layer 2 network interface card (L2 NIC), a transmission control protocol (TCP) processor and a ULP processor.

6. The server according to claim 5, wherein the TCP processor provides layer 3 processing and layer 4 processing.

7. The server according to claim 5, wherein the TCP processor is shared by two or more of TCP offload traffic, Internet small computer system interface (iSCSI) traffic and/or RDMA traffic.

8. The server according to claim 5, wherein the ULP processor provides iSCSI processing.

9. The server according to claim 5, wherein the ULP processor provides RDMA processing.

10. The server according to claim 1, comprising:
a server management agent coupled to the processor.

11. The server according to claim 10, wherein the server management agent is coupled to a keyboard service, a video service or a mouse service.

12. The server according to claim 1, wherein the plurality of services comprises two or more of a socket service, a SCSI miniport service, an RDMA service, a keyboard service, a video service or a mouse service.

13. The server according to claim 1,
wherein the unified driver is coupled to a software TCP processor and to a socket service switch,
wherein the software TCP processor is coupled to the socket service switch, and
wherein the socket service switch is coupled to a socket service.

14. The server according to claim 1, wherein the processor or the PCI bridge determines which of the different types of network traffic accesses a particular service provided by the server.

15. The server according to claim 14, wherein the particular service comprises one or more of a socket service, a SCSI miniport service, an RDMA service, a keyboard service, a video service or a mouse service.

16. The server according to claim 1, wherein the processor, the PCI bridge or the unified driver provides a unified data and control path.

17. A server, comprising:
a network connector;
a processor coupled to the network connector, the processor operable to process a plurality of different types of network traffic, wherein each of said plurality of different types of network traffic corresponds to a different network protocol;
a peripheral component interface (PCI) bridge coupled to the processor; and
a unified driver coupled to the PCI bridge, the unified driver operable to provide drivers associated with the plurality of different types of network traffic,
wherein the unified driver is coupled to a software TCP processor and to a socket service switch,
wherein the software TCP processor is coupled to the socket service switch, and
wherein the socket service switch is coupled to a socket service.

18. The server according to claim 17, wherein the network connector comprises an Ethernet connector.

19. The server according to claim 17, wherein the plurality of different types of network traffic comprises two or more of common Ethernet traffic, offload traffic, storage traffic, inter-process communication (IPC) traffic, management traffic or remote direct memory access (RDMA) traffic.

20. The server according to claim 17, wherein the processor comprises a single integrated chip.

21. The server according to claim 17, wherein the processor comprises a layer 2 network interface card (L2 NIC), a transmission control protocol (TCP) processor and a ULP processor.

22. The server according to claim 21, wherein the TCP processor provides layer 3 processing and layer 4 processing.

23. The server according to claim 21, wherein the TCP processor is shared by two or more of TCP offload traffic, Internet small computer system interface (iSCSI) traffic or RDMA traffic.

24. The server according to claim 21, wherein the ULP processor provides iSCSI processing.

25. The server according to claim 21, wherein the ULP processor provides RDMA processing.

26. The server according to claim 17, comprising:
a server management agent coupled to the processor.

27. The server according to claim 26, wherein the server management agent is coupled to a keyboard service, a video service or a mouse service.

28. The server according to claim 17, wherein the processor or the PCI bridge determines which of the different types of network traffic accesses a particular service provided by the server.

29. The server according to claim 28, wherein the particular service comprises one or more of a socket service, a SCSI miniport service, an RDMA service, a keyboard service, a video service or a mouse service.

30. The server according to claim 17, wherein the processor, the PCI bridge or the unified driver provides a unified data and control path.

* * * * *